(12) United States Patent
Hirt et al.

(10) Patent No.: US 7,743,395 B2
(45) Date of Patent: Jun. 22, 2010

(54) METHOD AND SYSTEM FOR USER-AWARE VIDEO DISPLAY

(75) Inventors: Walter Hirt, Wettswil (CH); Mircea Gusat, Langnau am Albis (CH); Maria Soimu, Langnau am Albis (CH)

(73) Assignee: Lenovo Pte. Ltd., Singapore (SG)

(*) Notice: Subject to any disclaimer, the term of this patent is extended or adjusted under 35 U.S.C. 154(b) by 942 days.

(21) Appl. No.: 11/158,420

(22) Filed: Jun. 22, 2005

(65) Prior Publication Data

US 2006/0015892 A1 Jan. 19, 2006

(51) Int. Cl.
| | |
|---|---|
| *H04H 60/56* | (2008.01) |
| *H04N 7/10* | (2006.01) |
| *H04N 7/16* | (2006.01) |
| *H04N 7/025* | (2006.01) |
| *H04N 7/173* | (2006.01) |
| *G06F 3/02* | (2006.01) |
| *G06F 3/14* | (2006.01) |
| *G06F 15/16* | (2006.01) |
| *G09G 5/00* | (2006.01) |

(52) U.S. Cl. .................. 725/35; 725/12; 725/117; 725/120; 725/141; 345/169; 345/633; 715/864; 709/217; 709/248

(58) Field of Classification Search .................. 725/10, 725/12, 35, 117, 120, 141
See application file for complete search history.

(56) References Cited

U.S. PATENT DOCUMENTS

| | | | | |
|---|---|---|---|---|
| 5,794,116 A | * | 8/1998 | Matsuda et al. | 725/114 |
| 6,148,005 A | * | 11/2000 | Paul et al. | 370/469 |
| 6,665,985 B1 | * | 12/2003 | Hennes | 52/7 |
| 7,062,573 B2 | * | 6/2006 | Tognazzini | 709/248 |
| 2006/0156356 A1 | * | 7/2006 | Sato et al. | 725/89 |

FOREIGN PATENT DOCUMENTS

WO   WO 02/084536   10/2002

OTHER PUBLICATIONS

Drane, Christopher et al, "Positioning GSM Telephones," IEEE Communications Magazine, vol. 36, No. 4, Apr. 1998, pp. 46-59.

* cited by examiner

*Primary Examiner*—Dominic D Saltarelli
(74) *Attorney, Agent, or Firm*—Sawyer Law Group, P.C.

(57) ABSTRACT

The present invention relates to a method and system for displaying a video signal in dependence on a user interaction. The system comprises a display for receiving the video signal, at least one transmitter for transmitting location signals, and at least three transceivers for receiving the location signals from the transmitter and for transmitting modified location signals. The geometric locations of the at least three transceivers are known to a computing device. The computing device is then able to derive a transmit location of the location signals based on the received modified location signals, wherein the computing device is adapted to modify the content of the video signal in response to the derived transmit location in dependence on the user interaction.

10 Claims, 10 Drawing Sheets

METHOD AND SYSTEM FOR USER-AWARE VIDEO DISPLAY

FIELD OF THE INVENTION

The present invention relates generally to a method and system for displaying a video signal on a display in dependence on a user interaction. Interesting applications become feasible which are based on a user-aware wireless video display offering full rate refresh at high resolution. The proposed system is particularly well suited for wireless communication and positioning technologies exploiting the ultra-wideband (UWB) radio channel recently made available by the US Federal Communications Commission (FCC) in the frequency range between 3.1 GHz and 10.6 GHz.

BACKGROUND OF THE INVENTION

Short-range wireless technologies in the wireless local area network (WLAN) space as well as wireless personal and body area networks (WPAN and WBAN) continue to proliferate rapidly. Similarly, wireless technology is increasingly applied to feed high-resolution video signals over a digital video interface (DVI) to hand-held or detachable flat panel displays (FPDS) as well as to stationary displays, e.g., display panels mounted on a wall a missing feature in these applications using DVIs is the capability to support user-aware, real-time or quasi real-time interactions in response to the user's position and orientation relative to the video display. Typically, conventional wireless video display systems operate by transmitting compressed video signals to the display, such that the latter requires decompression circuits, over license-free but narrow designated radio spectrum bands; however, these narrowband wireless systems can generally not support the desired high data rates for the transmission of raw high-resolution video signals. Furthermore, narrowband wireless systems are generally not capable to support applications requiring a precise indoor location tracking capability.

To mitigate the threat of a future spectrum shortage, additional radio spectrum in the form of the ultra-wideband (UWB) radio channel was recently made available for use in the USA in the range 3.1 GHz-10.6 GHz. European and Asian authorities are also preparing rulings to enable commercial marketing and use of devices based on UWB radio technology (UWB-RT).

High-definition television (HDTV) and high-resolution video display rendering will use DVIs with the added disadvantage that high transmission data rates are to be used between the video signal source and the display. For example, the digital DVI (DVI-D) standard link allows a digital connection from a set-top box (STB) to a display eliminating unnecessary digital to analog conversions and keeping the signal digital. Almost all STBs use DVI-D and do not carry any analog signal. An HDTV capable TV set has maximum resolution of 1920×1080 pixels (60 Hz AC power supply) and should only use a single link (cable or wireless), as do almost all DVI equipped displays. However, plasma screens and flat panel displays (FPDs) can have much higher resolutions and refresh rates and could use a dual or multiple DVI-D links. The requirement for very high data rates between the video signal sources and high-resolution displays is particularly demanding if the video signal is to be transmitted wirelessly to the display. Thus, there is a need for new solutions to increase both the effective data rate and the link distance between the video source and the display. This problem prevails equally when connecting a personal computer (PC) to a high-resolution video display through DVIs or other digital interfaces.

One possibility to overcome this problem is to split a high-rate data stream into multiple lower-rate data streams to achieve a compound data rate equal to the desired high-data rate. In such cases, designers are faced with the problem of choosing the best possible multi-stream technology for a given set of system parameters and criteria. There exist two different approaches: a) support of multiple data streams by means of co-located and non-interfering networks, also called piconets, and b) support of multiple data streams within a single communication cell based on a suitable multiple access (MA) technique. All of these approaches are based on an efficient channel access method and the most popular prior art MA methods are briefly described hereafter, listing their known features and suitability when applied to networks with terminals based on UWB-RT.

MA techniques, e.g., Time Division Multiple Access (TDMA), Frequency Division Multiple Access (FDMA), Code Division Multiple Access (CDMA), and in particular Rate Division Multiple Access (RDMA) as described by Martin Weisenhorn and Walter Hirt, "Novel Rate-Division Multiple-Access Scheme for UWB-Radio-Based Sensor Networks", IEEE Int. Zurich Seminar on Communications, pages 76-81, February 2004, have been known for some time. Some of these techniques could be applied to mitigate the high-rate video distribution problem. For example, when using RDMA, each data stream is transmitted by a binary antipodal signal, preferably with a low duty cycle, that can be distinguished at the destination receiver by an appropriate, unique choice of a user-specific pulse rate or a combination of at least two user-specific pulse rates. However, it may be advantageous in certain applications to combine the features and benefits of the basic RDMA method with one or more of the prior art multiple access methods.

Known wireless (video) displays include:
- PDA-like screens of low pixel resolution (320×240), near/full-motion video (15/30 fps (frames per second)), in high or true color format (12, 16 or 24 bit/pixel);
- tablet—SVGA up to XGA resolution, 16/24 bit/pixel, with full or reduced refresh rate; if full-motion video is supported, then the video stream is commonly MPEG-encoded when sent over a wireless channel, with data rates of 1-10 Mbps; and
- video projectors and TV displays with internal MPEG decoding engine and Wi-Fi® capability with nominal data rates of 11-54 Mbps (Wi-Fi is a registered trademark of the Wi-Fi Alliance).

While some of the above will support full-motion video in DVD or even HDTV quality, none of these display devices can sustain the high-resolution full-rate refresh requirements of a standard PC over a wireless channel. A distinction is made between a cinematographic and "full-motion" video display of 25, resp. 30 fps, and a more demanding notion of "full-rate" computer monitor, with refresh rates in excess of 60 fps. Here the requirements of full-rate display refresh are addressed.

A question worth asking is: How to wirelessly connect a full-rate high resolution PC monitor? A brief step-wise calculation of the bandwidth requirements yields the following results:
- a) A typical PC monitor resolution ranges from XGA (1024×768) up to QUXGA-W (3840×2560); most common resolutions are SXGA/+(1280×1024) and UXGA (1600×1200). The large scale introduction of HDTV will drive the standard PC resolution up to QXGA (2048×1536).

b) The minimum refresh rate for PC displays in TFT LCD technology is 60 fps.

c) Unlike video codecs such as MPEG-2/4, there seem to be no general codecs for GUIs (Graphical User Interfaces). A universal GUI display that works with a common operating system uses the least common denominator, i.e., un-encoded video transmission between the computer video source and its display. Otherwise, the lack of a large enough market would not allow the widespread use of full rate/motion wireless displays.

Thus the net bandwidth required by an XGA display at 60 fps is: (1024×768 pix)×(24 bit/pix)×(60 fps)=1132 Mbps or 1.132 Gbps. Assuming a 25% overhead for wireless encoding and protocol, the raw data rate for XGA is ~1.4 Gbps; for QXGA: ~5.7 Gbps; for QUXGA-W: ~17.7 Gbps.

Considering SXGA/UXGA, the most likely resolution used for PC, notebook and HDTV flat screens, it is found that the raw data rates are also very high for wireless transmission (SXGA: ~2.4 Gbps; UXGA: ~3.5 Gbps).

From the above it follows that there is still a need in the art for a scheme that allows displaying of a video signal on a display without cables and in particular in dependence on a user interaction. It would be further advantageous if the scheme enables a user-aware wireless video display offering full rate refresh at high resolution.

SUMMARY OF THE INVENTION

The present invention relates to a method and system for displaying a video signal in dependence on a user interaction. The system comprises a display for receiving the video signal, at least one transmitter for transmitting location signals, and at least three transceivers for receiving the location signals from the transmitter and for transmitting modified location signals. The geometric locations of the at least three transceivers are known to a computing device. The computing device is then able to derive a transmit location of the location signals based on the received modified location signals, wherein the computing device is adapted to modify the content of the video signal in response to the derived transmit location in dependence on the user interaction.

DETAILED DESCRIPTION

Figure 1A:
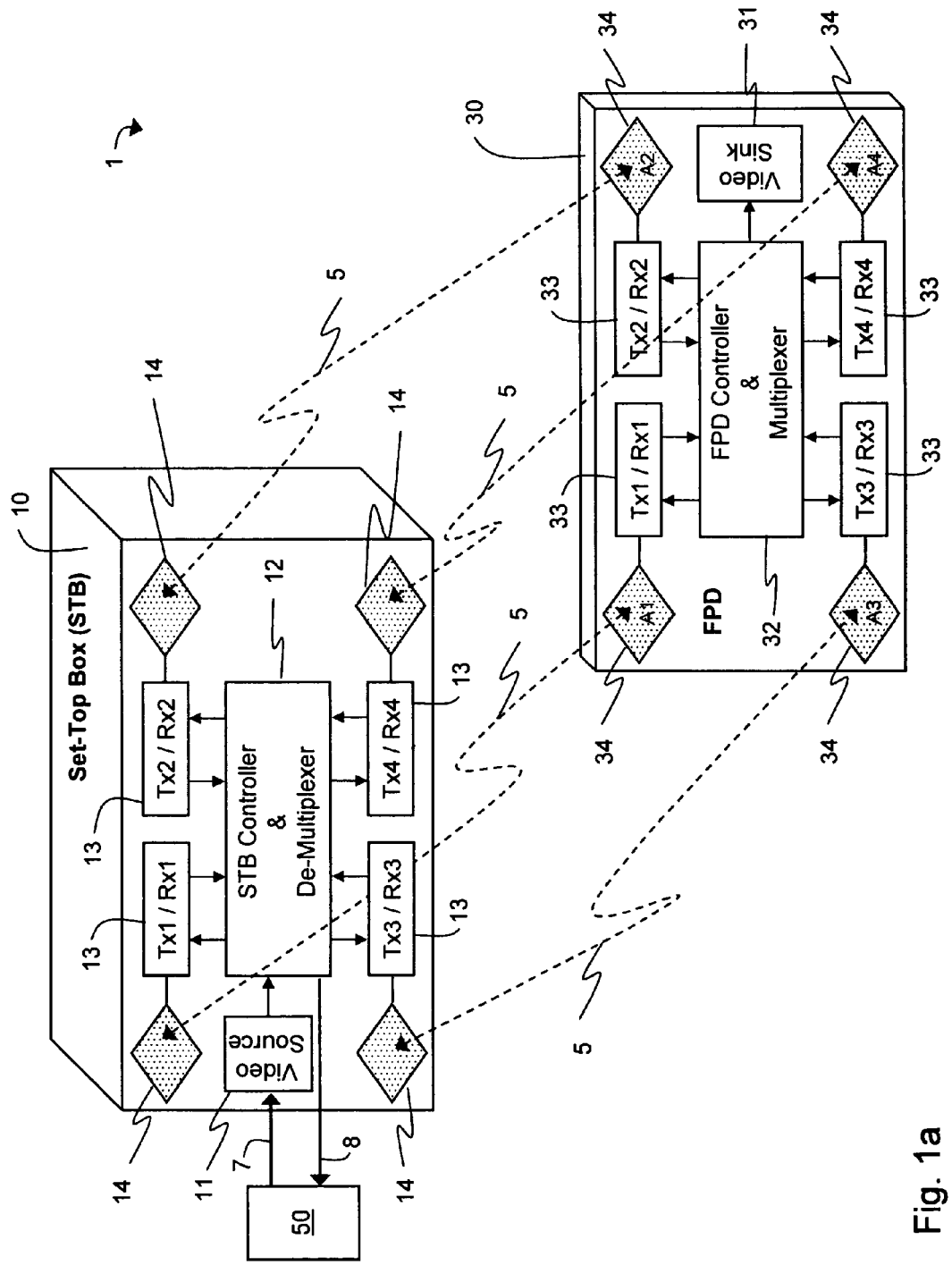
FIG. 1a illustrates a first wireless multi-channel video distribution system with a set-top box (STB) and a flat panel display (FPD).

The present invention relates generally to a method and system for displaying a video signal on a display in dependence on a user interaction. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In accordance with the invention, there is provided a system for displaying a video signal in dependence on a user interaction. The system comprises at least one transmitter to transmit a video signal, a display for receiving the video signal, at least one transmitter for transmitting location signals, and at least three transceivers for receiving the location signals from the transmitter and for transmitting modified location signals. The geometric locations of the at least three transceivers are known to a computing device. The computing device is then able to derive a transmit location of the location signals based on the received modified location signals, where afterwards the computing device is adapted to modify the content of the video signal in response to the derived transmit location in dependence on the user interaction. The user interaction changes or moves the transmit location of the location signals when, for example, a user moves the display or himself.

In a preferred embodiment multiple transmitters for transmitting location signals are used in order to increase accuracy of the location determination.

In accordance with another aspect of the invention, there is provided a method for displaying a video signal on a display in dependence on a user interaction. The method comprises the steps of receiving by the display the video signal from a computing device; transmitting location signals via at least three transceivers to the computing device; receiving by the computing device modified location signals from the at least three transceivers, the geometric locations of the at least three transceivers being known to the computing device; deriving by the computing device a transmit location of the location signals based on the received modified location signals; and modifying the content of the video signal in response to the derived transmit location in dependence on the user interaction.

The method can further comprise the steps of receiving by each of the at least three transceivers the location signals, determining arrival times from the received location signals, and transmitting by each of the at least three transceivers the determined arrival times within modified location signals to the computing device. This allows to provide the computing device with the relevant information for the subsequent determination of the transmit location.

When the display is a mobile or portable, tablet-like user-aware wireless display or flat panel display (FPD) that is freely movable by a user, then the user can decide by user interaction how something is shown or from which angle, e.g., of a picture, movie, or construction, it is displayed.

The position (location) of the display can be fixed or the display can mounted on a wall, and then the location signals can be transmitted by a beacon transmitter that can be attached to a user. Thus, the calculated transmit location of the location signals is directly related to the movement of the user. The fixed or mounted display can then be a stationary large size user-aware display usable for immersive virtual reality or other applications.

The connection between the computing device and the display can be established by cables (partly), various wireless links, or a combination thereof Best suited for the wireless links are UWB radio or other very wideband RF (radio frequency) technologies. The transmission of the video signal from the computing device to the display and the transmission of the location and modified signals to the computing device via the at least three transceivers can be performed by wireless links. Then, no cables are required, which allows more freedom of movement for the user.

As indicated, user awareness is enabled through two basic approaches: i) by determining the geometric position and orientation of the display with the transceivers, e.g., of a handheld wireless display panel, carried by a user within a reference frame; ii) by determining a user's geometric position and orientation in front of a stationary wireless display, while the user has a beacon transmitter attached.

When the display is stationary, e.g. mounted on a wall, then the geometric locations of the display are known to the computing device. The computing device is then able to derive the transmit location of the beacon transmitter relative to the display's geometric location based on the received modified location signals and to modify the content of the video signal in response to the derived transmit location of the beacon transmitter in dependence on the user interaction, i.e. movement of the beacon transmitter.

The video signal or channel can be split into at least three sub-channels, which can be realized, for example, with UWB radio technology, based on coordinated piconets. The at least three sub-channels can be de-multiplexed by a Graphical Processing Unit (GPU), or by a standard chipset at the read port of the video RAM. That means a high-rate video data stream can be split into multiple sub-streams, such that each sub-stream can be transmitted wirelessly to a full-rate high-resolution display, where the sub-streams are combinable into a composite video data stream (video signal). A suitable arrangement of the transceivers and the antennas associated with the display enable user-aware applications. The wireless display can feature full-rate/full-motion refresh at high resolutions.

At the receiving end, the display will process the video sub-channels by allocating and mapping each of them into one of the adjacent vertical stripes. Whereas the mapping to the actual screen circuitry can be done differently, a relevant feature is the geometrical location of the transmitter, as this defines the transmit location of the location signals. This location should be eligible or appropriate for wireless triangulation.

Based on today's technological developments and the assumption that further advanced state-of-the-art UWB wireless links will become available in the future, it is estimated that three or four parallel channels for SXGA and SXGA+ displays will be suitable to achieve a compound data rate of well above 1 Gbps over an acceptable distance.

The desire to split a high-rate video data stream into multiple sub-streams, such that each sub-stream can be transmitted wirelessly to the same destination, e.g., to a high-resolution display, can be exploited further and thus has further advantages. An implementation of a suitable arrangement of receiving antennas on the display can be used to enable user-aware applications or interactions, such that the user can interact with graphic or video shown on said display. Below are listed some advantages relating to displays, particularly high-resolution video displays, which are capable to support applications based on user awareness and/or interaction:

a triangulation-based localization—which enables user-awareness, virtual reality (VR) etc.—adds only a minor cost to the display, this comes as a by-product of having a full-rate high-resolution wireless display;

in the future, the implementation is possible with commercial-off-the-shelf (COTS) components;

wide range of applications, from scientific and engineering, design, business, e-learning, to consumer and entertainment;

potential products can be marketed both as commodity h/w and as dedicated, professional systems;

the affordability of implementations lowers the entry barriers of established virtual reality (VR) applications and may enable new, un-anticipated applications;

transmission of multiple sub-streams of data enables high aggregate data rates suitable for high-resolution video signal display;

suitable placement of multiple antennas on the display, that can be a flat panel display (FPD), can be exploited to enable applications desiring user-aware interaction;

the combination of multiplexed, full-rate high-resolution wireless video streaming to a movable display and simultaneous wireless 3D position location and tracking of the display enables novel user-aware applications, one such application is the portable tablet usable for virtual reality (VR) and 3D interaction, the innate hand-eye coordination property of the human sensorial system (retina>cortex>motor nerve>muscle) can be exploited;

expensive electro-mechanics are replaced by wireless triangulation (i.e., position location and tracking);

the combination of multiplexed, full-rate high-resolution wireless video streaming to a fixed display and simultaneous wireless 3D position location and tracking of a user in front of the fixed display enables novel user-aware applications, e.g., for engineers or designers, such an application is a large, wall-mounted user-aware display, where the same type of triangulation scheme enables an "immersive VR"-class of applications, without the need of wiring the users with intrusive sensors;

the precision of the 3D positioning can be optimized by proper geometric placement of the antennas on the display, e.g., by maximizing the spatial separation between antennas and mounting them in the same plane;

the precision of the 3D positioning can be further optimized by proper geometric placement of the at least three transceivers within the room where the display is used, e.g., in order to obtain minimal GDP (geometric dilution of precision), thus avoiding that all transceivers are placed within a plane;

3D positioning is preferably based on a TDOA (time difference of arrival) scheme.

In addition, the proposed space-multiplexed wireless video transmission scheme provides and supports:

multi-purpose video sources: from PCs to game consoles, DVD players, HDTV tuners, video-cams, video servers;

multi-purpose displays: the same wireless panel(s) could be used as tablet, monitor or HDTV display;

mobility within a range of up to 4 m, or farther at reduced frame rate;

a low cost wireless system that consists of four COTS chipsets, e.g., adapted from the USB2.0 or other connecting interfaces; and reduced costs of new applications and by-products, such as affordable virtual reality (VR).

Of particular interest are the user-aware displays and "immersive VR" systems, when built on commodity hardware. Such systems can be used for scientific and engineering visualization, remote learning, telemedicine, conferencing systems, e-retail, arcade and multi-user/Net-based games.

FIG. 1a illustrates a wireless multi-channel video distribution system 1 comprising a set-top box (STB) 10 and a flat panel display (FPD) 30 which are connected via wireless links 5. The set-top box 10 comprises a video source interface 11, an STB Controller & De-Multiplexer unit 12, and STB transmit/receive units 13 that are connected to STB antennas 14 and the STB Controller & De-Multiplexer unit 12, respectively. The STB Controller & De-Multiplexer unit 12 receives the video signal from the video source interface 11 that is connected to a computing device 50 that provides the video signal, also referred to as video data stream, via a video link 7. The computing device 50 receives modified location signals via an information link 8 from the STB Controller & De-Multiplexer unit 12.

The flat panel display (FPD) 30 comprises a video sink unit 31, an FPD Controller & Multiplexer unit 32, and display transmit/receive units 33 that are connected to FDP antennas 34 and the FPD Controller & Multiplexer unit 32, respectively. The FPD Controller & Multiplexer unit 32 provides the received video signal to the sink unit 31 for further processing and displaying.

In the set-top box 10, the video data stream coming from the computing device 50 is here divided into four parallel data sub-streams to feed i) four independent piconets or ii) a multi-user communication network operating within a single communication cell, where each display transmit/receive unit 33 built into the display 30 is at least capable of receiving one of the four sub-streams. When receiving one of the four sub-streams each display transmit/receive unit 33 together with its corresponding FDP antenna 34 is also referred to as display receiver.

In this setup, the set-top box 10 transmits preferably uncompressed video signals in each sub-channel to remove the burden of signal decompression in the display 30, thereby reducing power consumption and cost.

Figure 1B:
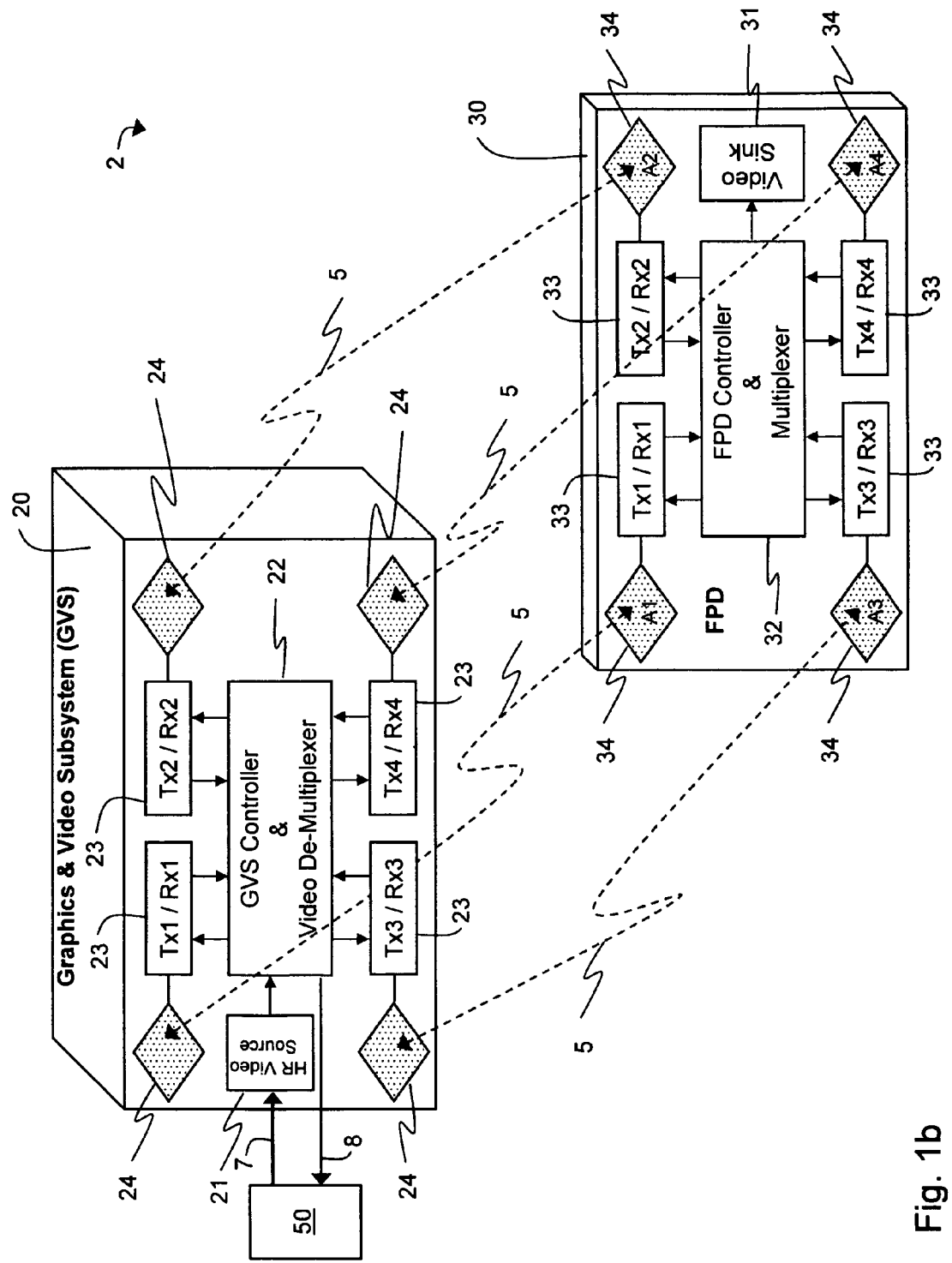
FIG. 1b illustrates a further wireless multi-channel, high-resolution video distribution system with a graphic and video sub-system (GVS) and a flat panel display (FPD).

Similarly, FIG. 1b illustrates a wireless multi-channel, high-resolution video distribution system 2 comprising a graphic and video sub-system (GVS) 20 and the flat panel display 30. The same reference numbers are used to denote the same parts or the like. The graphic and video sub-system 20, short GVS 20, comprises a high-resolution video source interface 21, a GVS Controller & Video De-Multiplexer unit 22, and GVS transmit/receive units 23 that are connected to GVS antennas 24 and the GVS Controller & Video De-Multiplexer unit 22, respectively. The GVS Controller & Video De-Multiplexer unit 22 receives a high-resolution video signal from the computing device 50 via the video link 7 and the high-resolution video source interface 21. On the other hand, the computing device 50 receives modified location signals via the information link 8 from the GVS Controller & Video De-Multiplexer unit 22.

In the graphic and video sub-system 20, the high-resolution video data stream coming from the computing device 50 is divided by the GVS Controller & Video De-Multiplexer unit 22 into four parallel data sub-streams to feed i) four independent piconets or ii) a multi-user communication network operating within a single communication cell. Generally, each display transmit/receive unit 33 built into the display 30 and connected to the respective FDP antenna 34 (A1, A2, A3 or A4) is at least capable of receiving one of the four data sub-streams transmitted via the GVS antennas 24. A1, A2, A3 and A4 indicate the transmit location of the respective FDP antenna 34 of the display 30. The positions of the FPD antennas 34 at the display 30 and particularly the distances between the antennas are a priori known by design. For both embodiments indicated in FIGS. 1a and 1b, the four FPD antennas 34 and respective transmit/receive units 33 offer three different modes of operation that can be used separately or in combination:

High Data Rate Video Streaming

Aggregation of the four parallel sub-system data streams to obtain a four-fold compound data rate enabling high rate video streaming to the display 30. This mode solves the problem that a single wireless link 5 may not be able to sustain the desired high compound data rate over the preferred distance.

Improved Link Range and/or Link Robustness

The set-top box 10 and the flat panel display 30 form a multiple-input/multiple-output (MIMO) transmission channel, where the set-top box 10 emits the same video source data over all sub-channels, thereby introducing a spatial diversity effect that can be exploited. Correspondingly, all four FPD antennas 34 and display transmit/receive units 33 receive up to four versions of the same video source data stream. This allows the display system to exploit the advantages of MIMO communication by i) achieving a higher data rate over a given link distance or ii) achieving an increased link distance for a given lower data rate or iii) achieving a higher link robustness or iv) using any combination of i) to iii).

Position Location and Tracking

With each of the four independent FPD antennas 34 placed in one of the corners of the display 30 (maximum spatial separation) the display 30 can be enabled with user-awareness by sensing the geometric position of the four FPD antennas 34. From knowledge of the positions of at least three of these antennas 34 the orientation of the panel's viewing plane and its absolute position within a reference frame can be determined; such information is useful for graphic rendering applications requiring user awareness for interactive display operation and feedback. Further details of this operational mode will be discussed below.

Figure 2A:
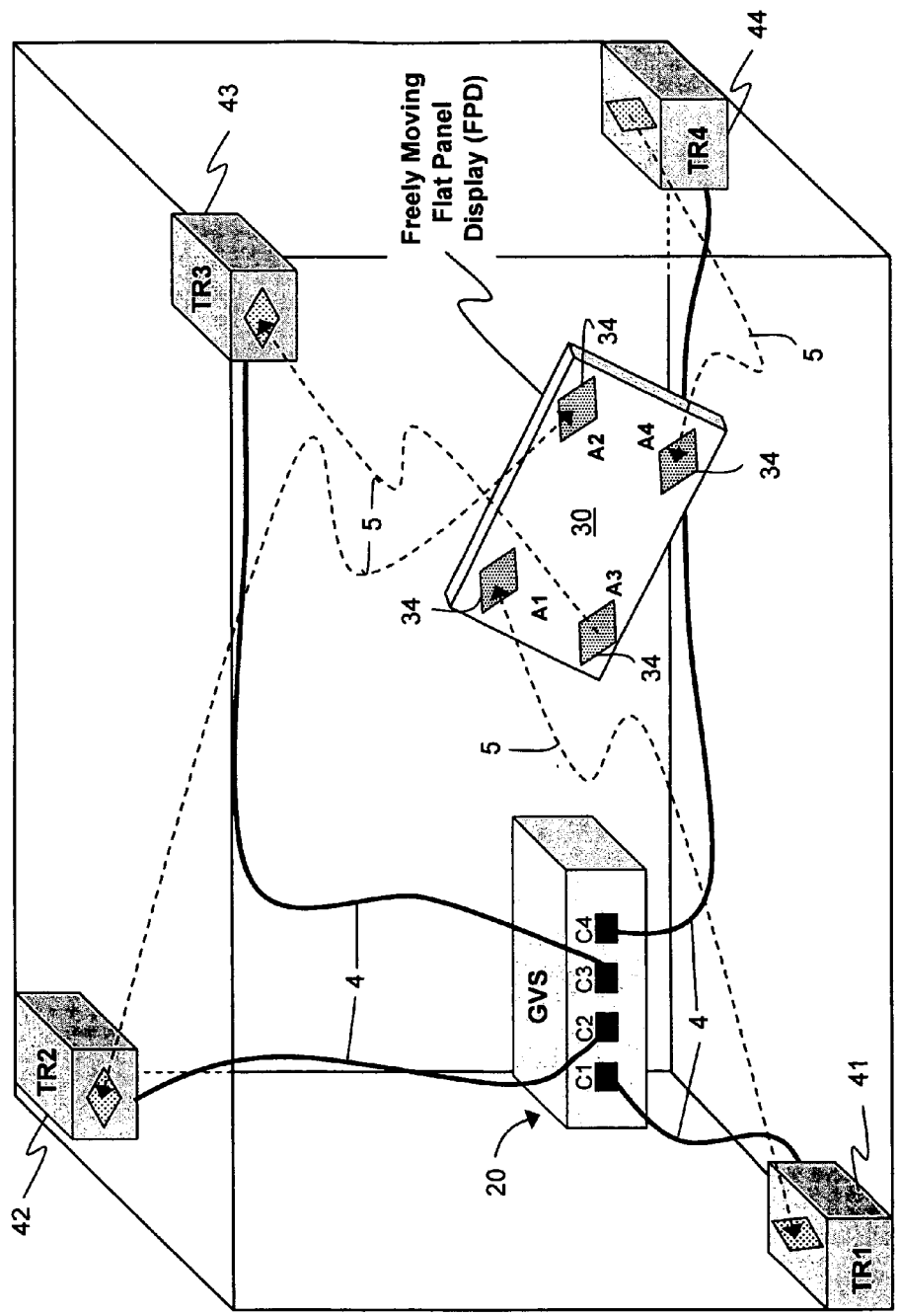
FIG. 2a shows a basic system setup usable to support high-resolution video signal distribution to an un-tethered FPD when the data sub-streams are sent from a GVS to wireless transceivers (TR1, TR2, TR3 and TR4) by means of wires.
Figure 2B:
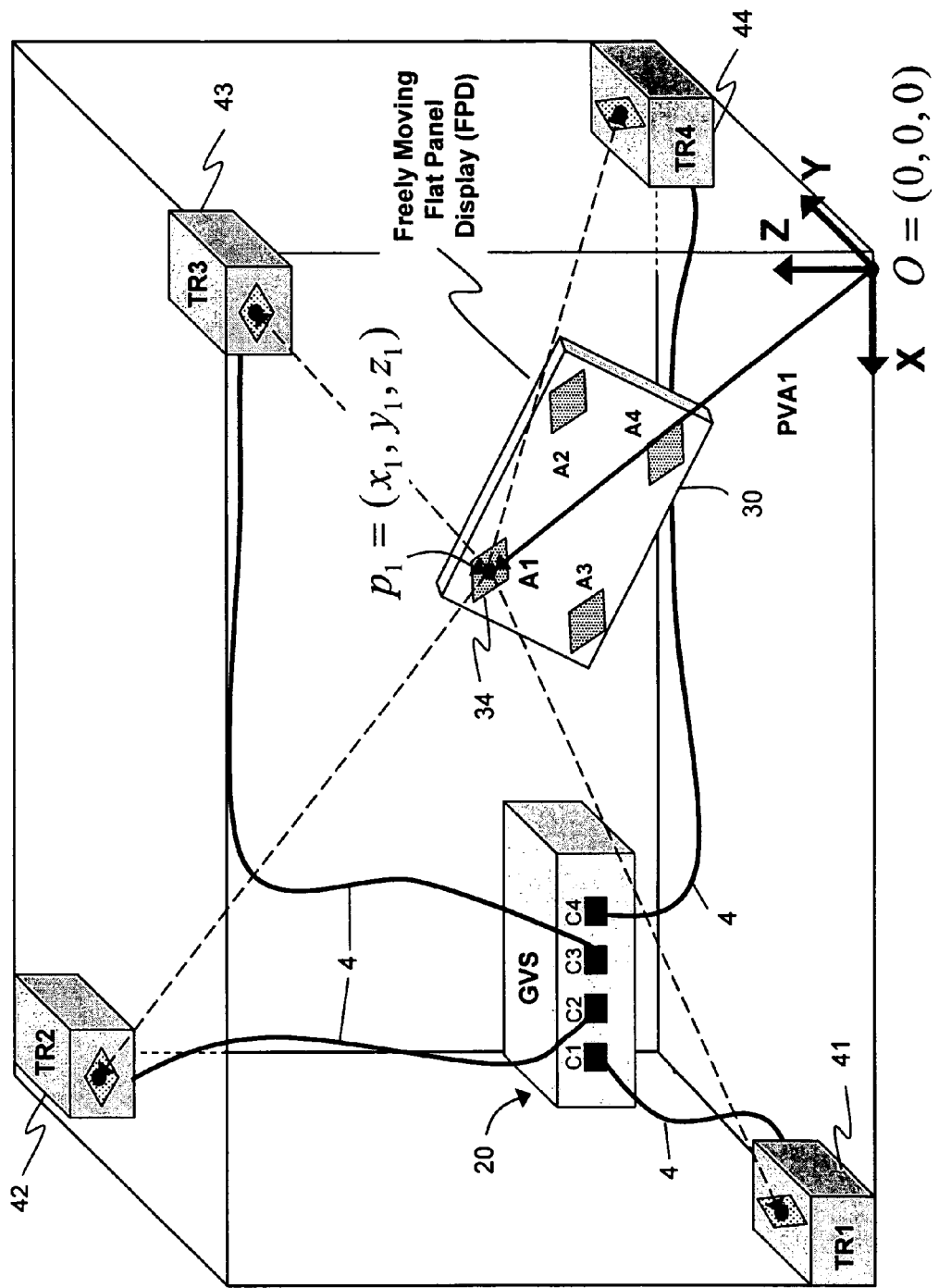
FIG. 2b shows the basic system setup of FIG. 2a supporting localization and tracking of one antenna (A1) of the FPD within the reference frame defined by the indicated (x, y, z) coordinate system with origin O=(0, 0, 0).
Figure 2C:
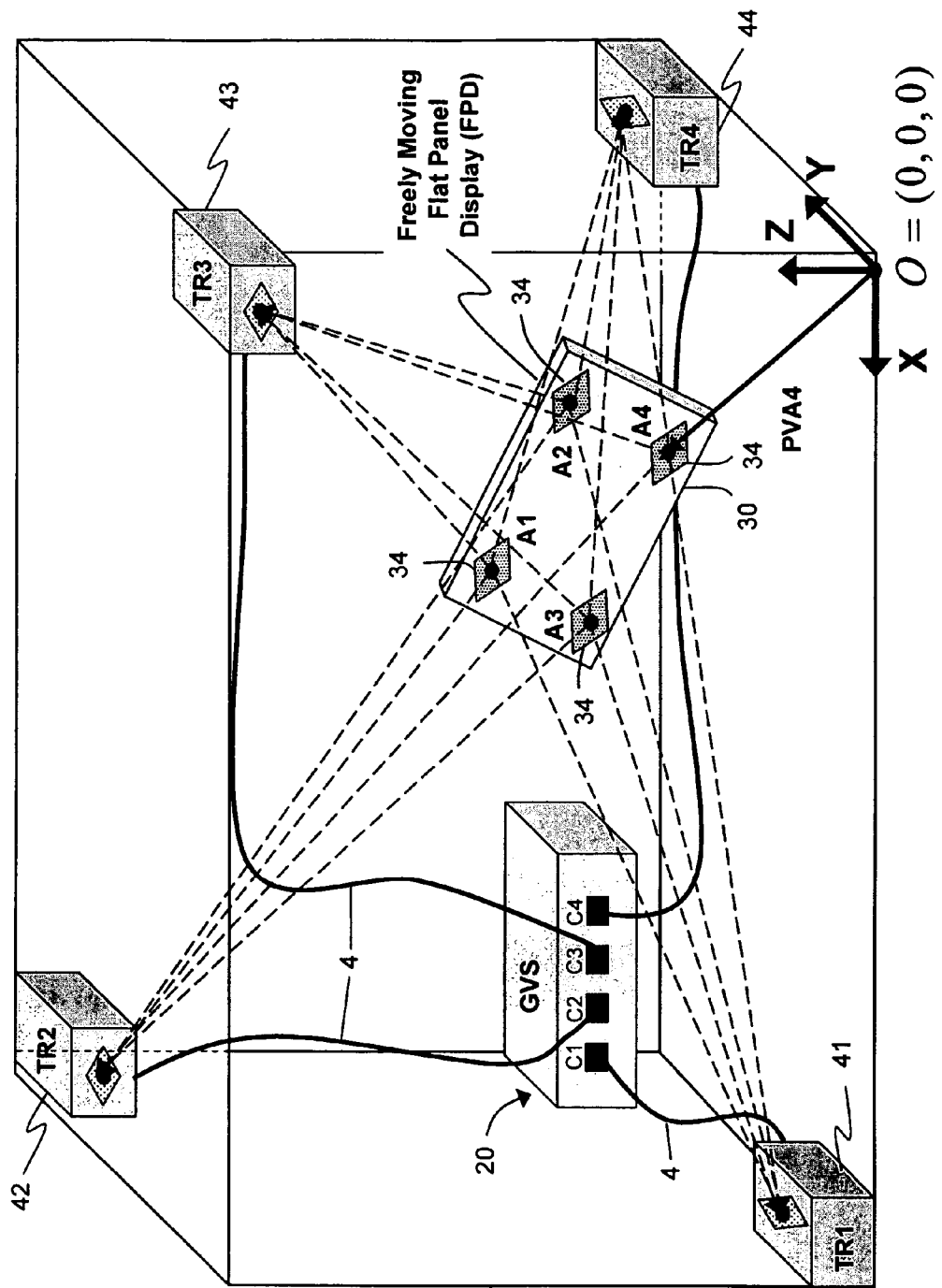
FIG. 2c illustrates an extension of the setup shown in FIG. 2b to all four antennas of the FPD, where the position of antenna An is determined by the position vector of antenna n (PVAn) as defined by the coordinates $p_n=(x_n, y_n, z_n)$, n=1,2,3,4 (for reasons of clarity, only PVA4 is shown).

FIGS. 2a, 2b and 2c illustrate a basic system setup in an office or residential environment with wireless transceivers 41, 42, 43, 44, also referred to as transceivers 41-44. FIG. 2a shows the setup usable to support high-resolution video signal distribution, over four sub-channels (C1-C4) to an untethered display 30 when the video data is sent to the wireless transceivers 41, 42, 43, 44, also labeled with TR1, TR2, TR3 and TR4, by means of cables or cable links 4. Depending on the application, the wireless links 5 between the transceivers 41, 42, 43, 44 and the display 30 may be unidirectional or bidirectional, as indicated in the figure. In this first arrangement where the primary application is to feed a video signal to the display 30, the actual positions of the transceivers 41-44 is not critical as long as the desired quality of service (QoS) can be maintained over the wireless links 5.

FIG. 2b illustrates how the video streaming system setup can be used to support localization and tracking of one FDP antenna 34, here also referred to as antenna A1, of the display 30 within a reference frame defined by the indicated (x, y, z) coordinate system with origin O=(0, 0, 0). The respective location or position of the antennas are indicated by and labeled with An, with n=1,2,3,4. As indicated in the figure, the position of antenna A1 (e.g., the antenna's feed point may be used to define its position) is determined by the position vector of antenna A1 (PVA1) defined by the geometric coordinates $p_1=(x_1, y_1, z_1)$, which can be determined by the following procedure. For reasons of simplicity, detailed descriptions are only given for antenna A1; similar procedures can be applied to the other FDP antennas, labeled with A2, A3 and A4 as indicated in FIG. 2c.

1) Antenna A1 emits a so-called positioning signal (PS), e.g., in the form of an acknowledgment (ACK) signal after reception of a video data packet, that is receivable by each of the four transceivers 41-44 (TR1, TR2, TR3 and TR4) and that comprises unambiguous information to identify it as a signal emitted from antenna A1. The time instant of this emission is not known and thus not available anywhere in the system.

2) The transceivers 41-44 (TR1, TR2, TR3 and TR4) register reception of the PS from antenna A1 and relay the source identification information and a time count to the GVS 20 in the manner as described in the U.S. patent application 20030174086, presently assigned to the assignee of the instant application and the disclosure of which is incorporated herein by reference. Alternatively, the transceivers 41-44 have the capability to measure the absolute arrival time of the PS sent by antenna A1, in which case the transceivers 41-44 forward the source identification information and the absolute arrival time to the GVS 20 within the modified location signals.

3) Given the known propagation times between each transceiver 41, 42, 43, 44, and the GVS 20, a processing unit (not shown) in the computing device 50 first computes the time difference of arrival (TDOA) between three pairs of received transceiver signals. Alternatively, the TDOA values can be computed from measured absolute arrival times, which are sent by transceivers 41-44 via the GVS 20 to the processing unit (computing device) 50. This procedure yields sufficient information to find a solution based on known methods for the position vector of antenna A1 (PVA1): $p_1=(x_1, y_1, z_1)$.

4) The above procedure can be repeated in parallel or sequentially for each FPD antenna 34 of the display 30 to yield position vectors for each FPD antenna 34: $p_n=(x_n, y_n, z_n)$, n=1,2,3,4. Any three of these vectors can be used to define the orientation of the FPD 30 plane while the fourth redundant position vector may be used to improve the plane's parameter estimates (see also FIG. 3b).

5) The information of the FPD plane orientation within the reference frame can be used by the application that renders the video signal for display.

Figure 3A:
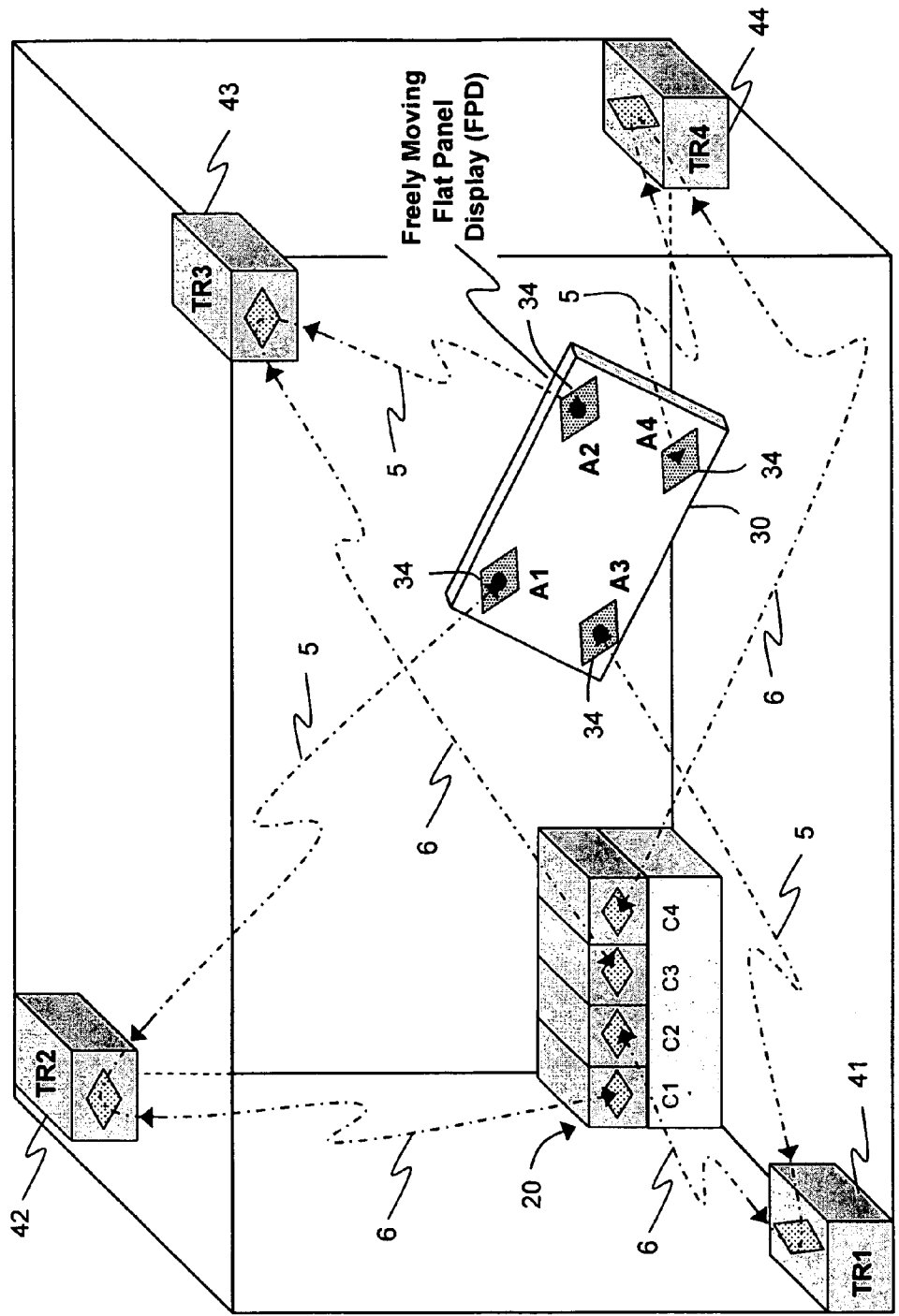
FIG. 3a shows a further basic system setup usable to support high-resolution video signal distribution to an un-tethered FPD when the data sub-streams are sent to the wireless transceivers (TR1, TR2, TR3 and TR4) by means of further wireless links, preferably based on UWB-RT.

A further embodiment of the proposed system is indicated in FIG. 3a, showing the basic system setup usable to support high-resolution video signal distribution to the un-tethered display 30 when the data sub-streams are sent to the wireless transceivers 41, 42, 43, 44 (TR1, TR2, TR3 and TR4) by means of further wireless links 6, thereby replacing the cable links 4 illustrated in FIG. 2a.

Figure 3B:
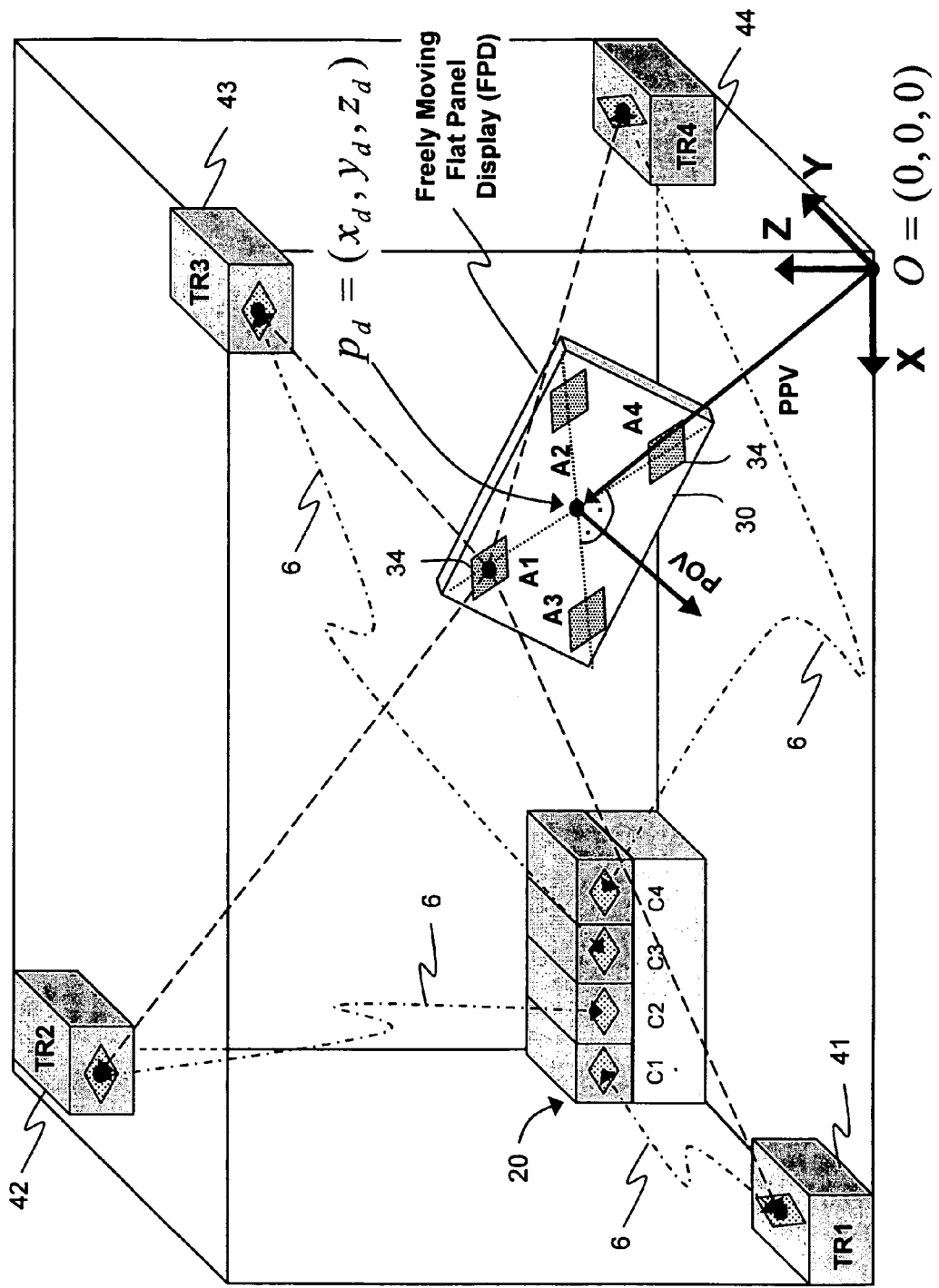
FIG. 3b shows the basic system setup of FIG. 3a supporting localization and tracking of the spatial position of antenna A1 mounted on the FPD within a reference frame, defined by the indicated (x, y, z) coordinate system with origin O=(0, 0, 0).

Consequently, FIG. 3b shows an alternative to the embodiment illustrated in FIG. 2b, where FIG. 3b indicates how the orientation of the FPD plane can be defined after at least three of the four antenna positions (A1, A2, A3, A4) within the FPD plane have been determined. In particular, the position and orientation of the FPD plane is defined by i) the panel position vector (PPV) pointing to the geometric center of the FPD plane and ii) the plane orientation vector (POV) positioned perpendicular to the FPD plane; without loss of generality, the POV may be a normalized unit vector. The coordinates of the PPV and the POV, derivable from the TDOA measurements described above, provide sufficient information for an application program rendering video signals in response to the FPD's geometric position and orientation within the geometric reference frame defined by the (x, y, z) coordinate system with origin O=(0, 0, 0).

In operation, the content of a video signal on the display 30 is modified in dependence on a user interaction, i.e., when a user moves the display 30. Generally, the display 30 receives the video signal form the computing device 50.

Location signals are transmitted from the FPD antennas 34 via the at least three transceivers 41-44 and the GVS 20 to the computing device 50. In the transceivers 41-44, whose geometric locations are also known to the computing device 50, the received location signals are transformed to modified location signals which then include arrival time information. The computing device 50 that then receives the modified location signals from the transceivers 41-44 is able to derive each transmit location (A1, A2, A3, A4) of the location signals based on the received modified location signals. The content of the video signal is then modified by the computing device 50 in response to the derived transmit location (A1, A2, A3, A4) in dependence on the user interaction, that is the movement of the display 30 in all directions.

Figure 4A:
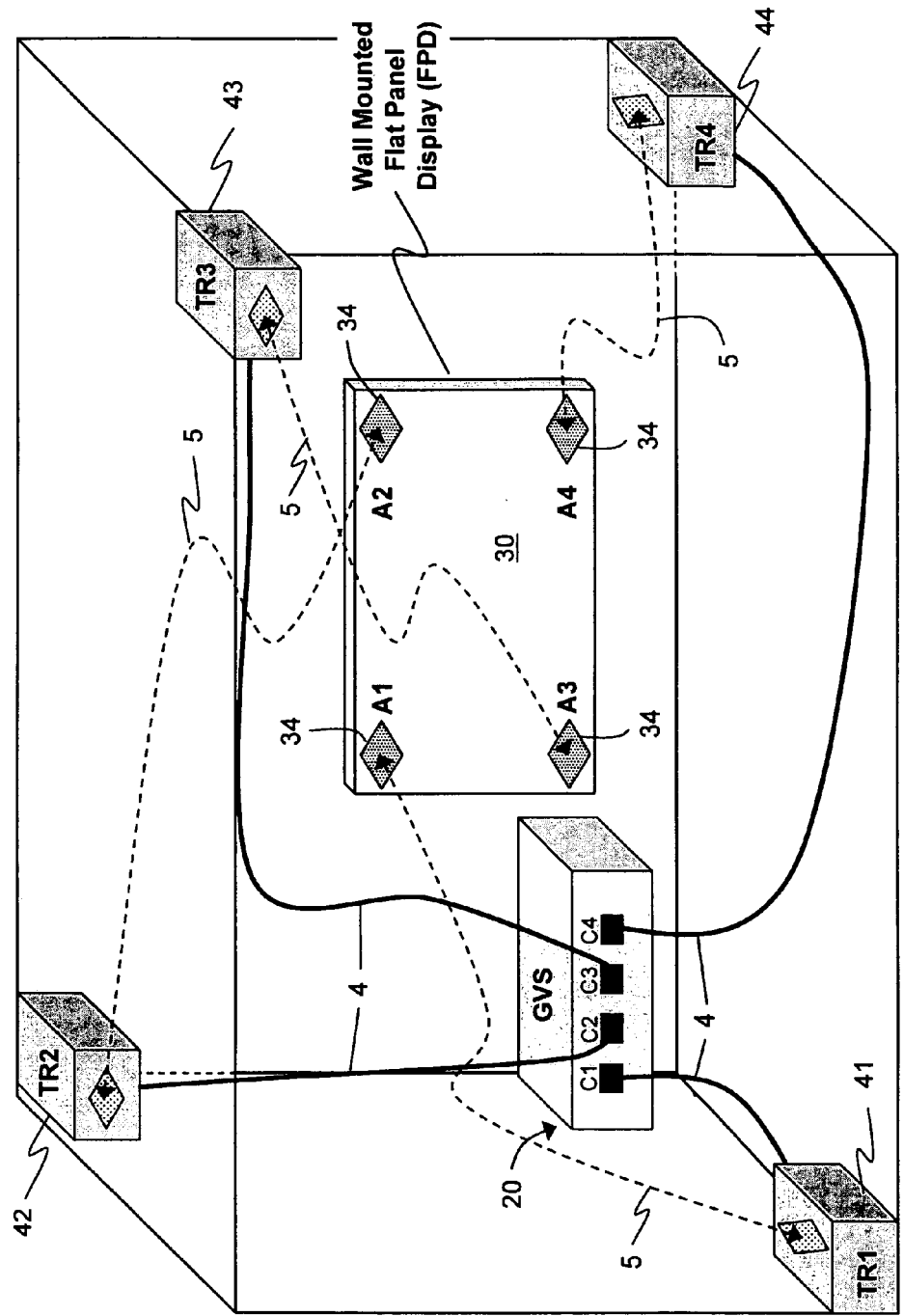
FIG. 4a illustrates a further basic wireless multi-channel video distribution system with a graphics and video sub-system (GVS) and a wall mounted, stationary flat panel display (FPD).

A further application of the display 30 is illustrated in FIG. 4a, where the display 30 remains in a stationary position, for example by mounting it on a wall. Depicted is a wireless multi-channel video distribution system with the GVS 20 and the display 30 that here is a wall mounted flat panel display 30. In the GVS 20, the video source's data stream is divided into four parallel data sub-streams (C1-C4) that are carried by cable links 4 to the respective transceivers 41-44. The latter transmit the data sub-streams via the wireless links 5 either by means of i) four independent piconets or ii) by making use of a multi-user communication network operating within a single communication cell. Generally, each display transmit/receive unit 33 built into the display 30 and connected to the respective antenna 34 is at least capable of receiving one of the four data sub-streams via the wireless links 5.

Figure 4B:
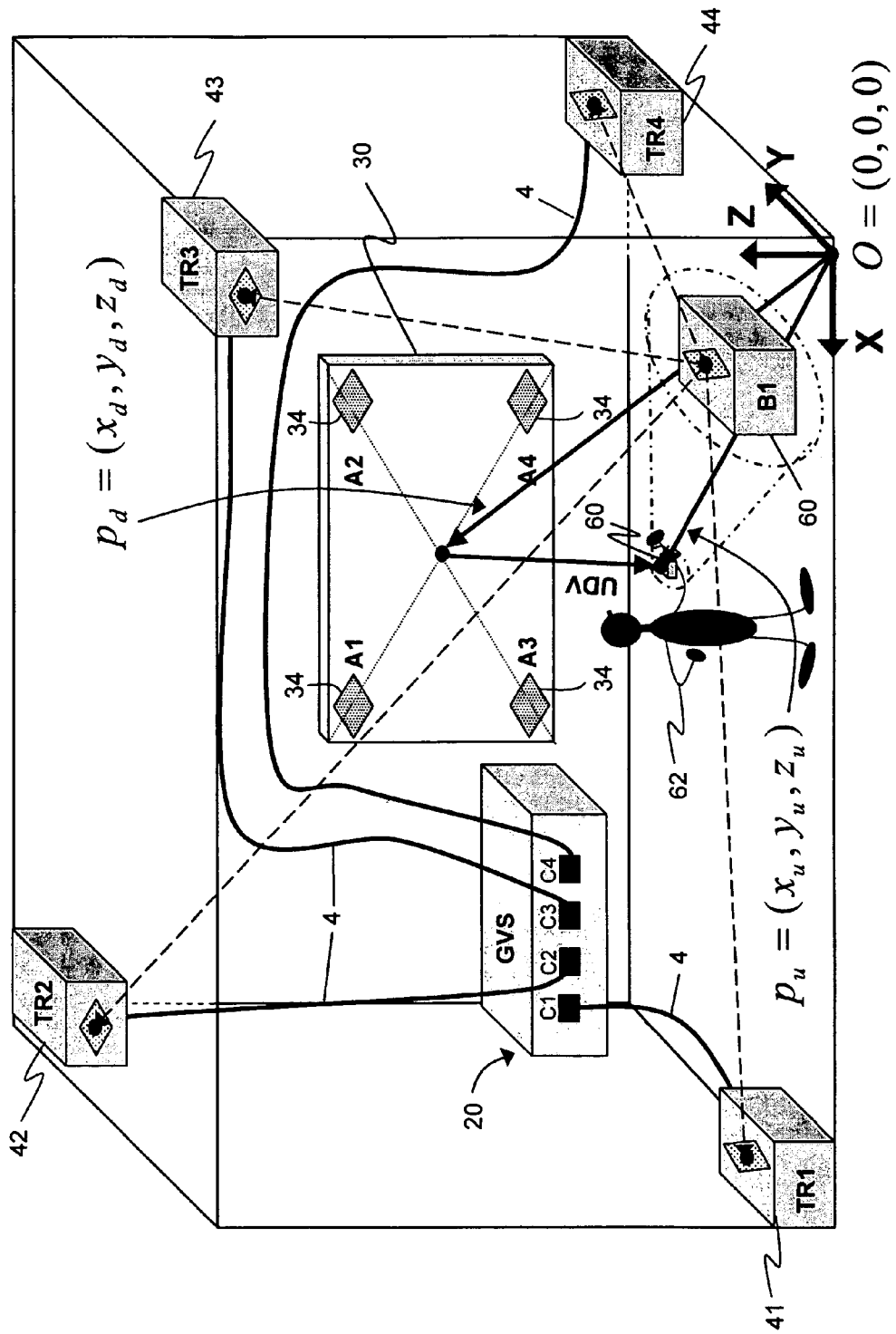
FIG. 4b illustrates another basic wireless multi-channel video distribution system capable to support applications based on user interaction.

FIG. 4b illustrates further the basic wireless multi-channel video distribution system introduced in FIG. 4a to support applications based on user interaction. The system comprises again the GVS 20 and the wall mounted flat panel display, i.e., the display 30. In the GVS 20, the video source's data stream is divided into four parallel data sub-streams (C1-C4) that are carried by the cables links 4 to the corresponding transceivers 41-44. The latter transmit the data sub-streams either by means of i) four independent piconets or ii) by making use of a multi-user communication network operating within a single communication cell. Generally, each display transmit/receive unit 33 built into the display 30 and connected to the respective antenna 34 (with position A1, A2, A3 or A4) is at least capable of receiving one of the four data sub-streams. The system is enhanced with a transmitting beacon 60, also referred to as beacon transmitter 60, carried by a user 62. The place of the beacon transmitter 60 defines here the transmit location. This arrangement allows measurement of the user's position $p_u=(x_u, y_u, z_u)$ and his orientation with respect to the stationary display 30. In this setup, the display's position is known and defined as its geometric center with the coordinates $p_d=(x_d, y_d, z_d)$, thus the user direction vector (UDV), indicating a users's position relative to the FPD's known position and orientation, is obtained by the vector difference $p_{UVD}=p_u-p_d=(x_u-x_d, y_u-y_d, z_u-z_d)$. The coordinates of the UVD, $p_u=(x_u, y_u, z_u)$, are derivable from the TDOA measurements as described above; together with the display's known position and geometric orientation, $p_d=(x_d, y_d, z_d)$, sufficient information can be provided to an application program rendering video signals in response to the user's geometric position that is the transmit location of the beacon transmitter 60, indicated with B1. Thus, the user's location within the geometric reference frame defined by the (x, y, z) coordinate system with origin O=(0, 0, 0) can be determined. The application program that modifies the video signal executes on the computing device 50 which for simplicity is not shown in the figure. The computing device 50 can be any computer or sever that is able to influence the video signal based on the calculations.

In operation, the display 30 receives the video signal form the computing device 50 via the GVS 20 and the transceivers 41-44. As indicated, the geometric location and orientation of the display 30 is known. Location signals are transmitted by the beacon transmitter 60 via the transceivers 41-44 and the GVS 20 to the computing device 50. In the transceivers 41-44, whose geometric locations are also known to the computing device 50, the received location signals are transformed to modified location signals which then include arrival time information. The computing device 50 that then receives the modified location signals from the transceivers 41-44 is able to derive a transmit location (B1) of the location signals relative to the display's geometric location based on the received modified location signals. The content of the video signal is then modified by the computing device 50 in response to the derived transmit location (B1) in dependence on the user interaction by the user 62.

Alternatively, in the setup of FIG. 4b, it is not necessary to know the display's position a priori. Similarly to the embodiment illustrated in FIG. 3b, it is possible to determine the display position coordinates $p_d=(x_d, y_d, z_d)$ by measuring TDOA parameters and to compute the display position coordinates from location signals transmitted via the FPD's antennas (A1-A4).

Figure 4C:
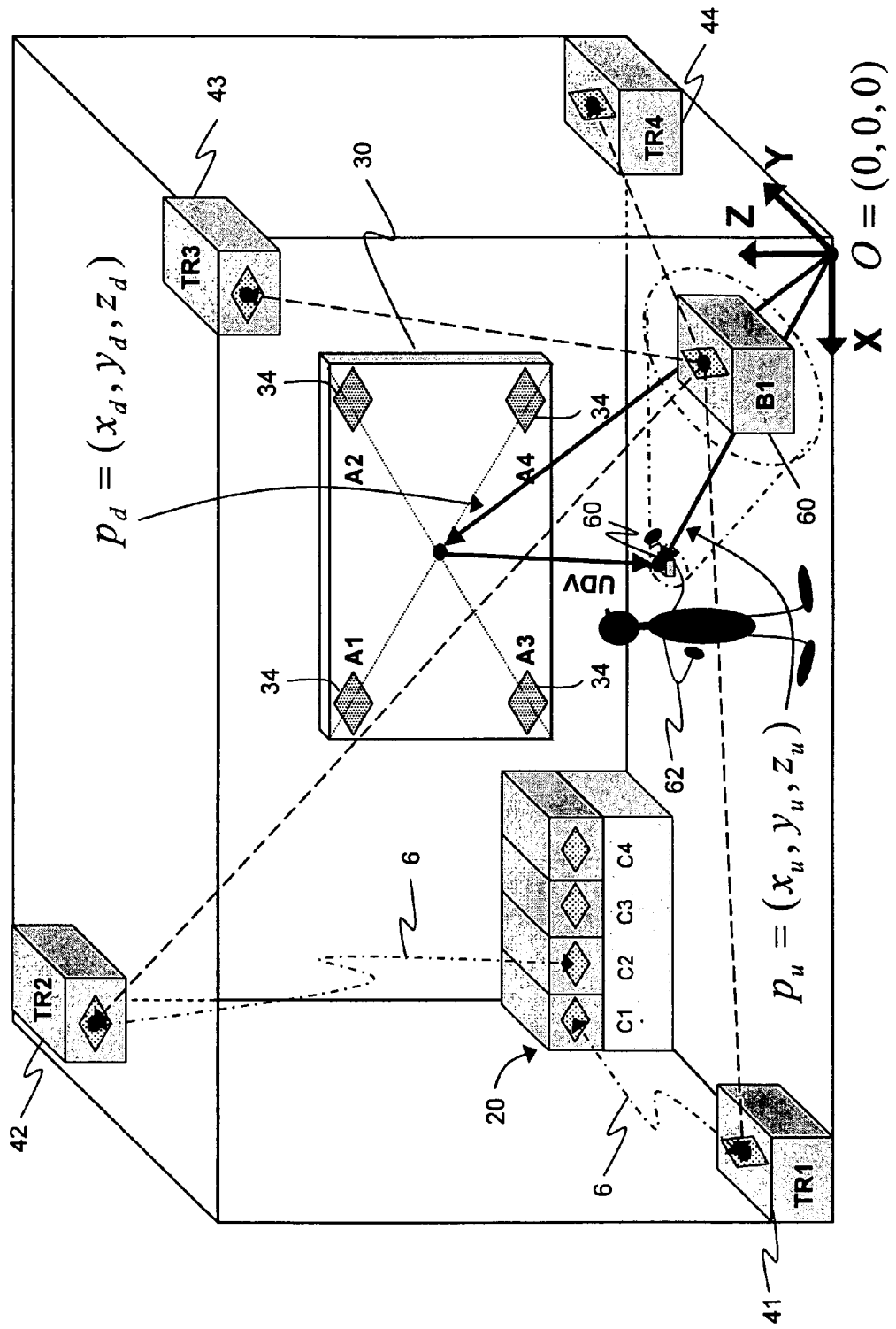
FIG. 4c illustrates the system of FIG. 4b but with the difference that the wired links between the GVS and the transceivers (TR1, TR2, TR3, TR4) have been replaced by wireless links (for reasons of clarity, only the links between the GVS and TR1 and TR2 are shown).

A further alternative to the system shown in FIG. 4b is indicated in FIG. 4c, where the cable links 4 between the GVS 20 and the transceivers 41-44 have been replaced by further wireless links 6, i.e., the four data sub-streams (C1-C4) are sent wirelessly to the reference transceivers 41-44.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying a video signal on a display in dependence on a user interaction, the method comprising the steps of:
   receiving by the display the video signal from a computing device; transmitting location signals from at least one transmitter via at least three transceivers to the computing device;
   receiving by the computing device modified location signals from the at least three transceivers whose geometric locations are known to the computing device;
   deriving by the computing device a transmit location of the location signals on the received modified location signals;
   modifying the content of the video signal in response to the derived transmit location in dependence on the user interaction, wherein the at least one transmitter is coupled to the display, wherein the at least one transmitter provides the modified location signals for determining a physical orientation of the display within a reference frame based on the user interaction; and
   dividing the video signal by a video sub-system controller and video de-multiplexer unit into a plurality of parallel data sub-streams to feed one or more channels selected from the group consisting of a plurality of piconets and a multi-user communication network operating within a single communication cell.

2. The method according to claim 1 further comprising the steps of:
   receiving by each of the at least three transceivers—the location signals, determining arrival times from the received location signals, and
   transmitting by each of the at least three transceivers the determined arrival times within modified location signals to the computing device.

3. The method according to claim 1 further comprising connecting the computing device to the display by wireless links.

4. The method according to claim 1 further comprising in the event of a fixed display a step of transmitting the location signals by a beacon transmitter.

5. The method according to claim 4, wherein the beacon transmitter is attached to a user.

6. The method according to claim 1 further comprising splitting the video signal that comprises a video data stream into multiple sub-streams, such that each sub-stream is transmittable wirelessly to the display, where the sub-streams are combinable into a composite video data stream.

7. A system for displaying a video signal in dependence on a user interaction comprising:
   a display for receiving the video signal wherein the display can sustain the high-resolution full-rate refresh requirements of a standard personal computer over a wireless channel;
   at least one transmitter for transmitting location signals;
   at least three transceivers for receiving the location signals from the at least one transmitter and for transmitting modified location signals, the geometric locations of the at least three transceivers being known to the computing device;
   a video sub-system controller and video de-multiplexer unit; and
   a computing device for deriving a transmit location of the location signals based on the received modified location signals, wherein the computing device is adapted to modify the content of the video signal in response to the derived transmit location in dependence on the user interaction, wherein the at least one transmitter is coupled to the display, wherein the at least one transmitter is adapted to provide the modified location signals for determining a physical orientation of the display within a reference frame based on the user interaction; wherein the video coming from the computing device is divided by the video subsystem controller and video de-multiplexer unit into a plurality of parallel data sub-streams to feed one or more channels selected from a group consisting a plurality of piconets and a multi-user communication network operating within a single communication cell.

8. The system according to claim 7, wherein the at least three transceivers are adapted to determine arrival times from the received location signals, the determined arrival times are transmittable by the at least three transceivers within the modified location signals to the computing device.

9. The system according to claim 7, wherein the display is a mobile display.

10. The system according to claim 7 comprising
wireless links for the transmission of the video signal from the computing device to the display and the transmission of the location and modified signals to the computing device via the at least three transceivers.

* * * * *